J. R. CANION.
HORSETAIL HOLDER.
APPLICATION FILED SEPT. 5, 1912.
1,064,707.
Patented June 17, 1913.
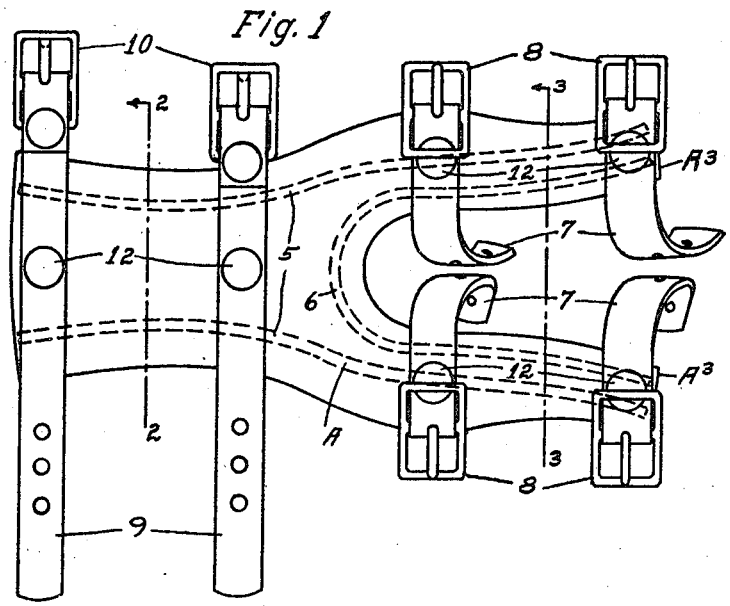
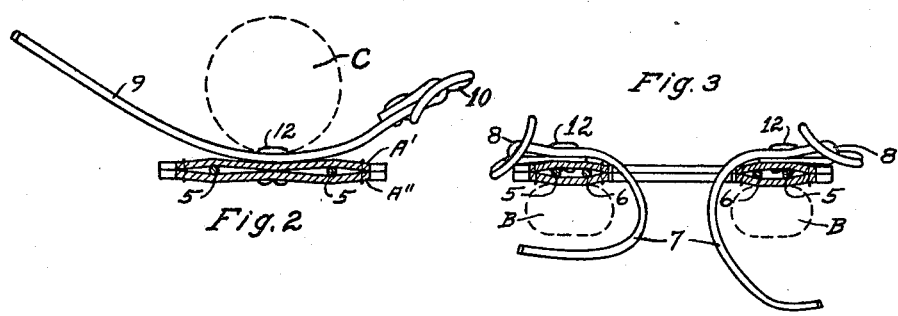
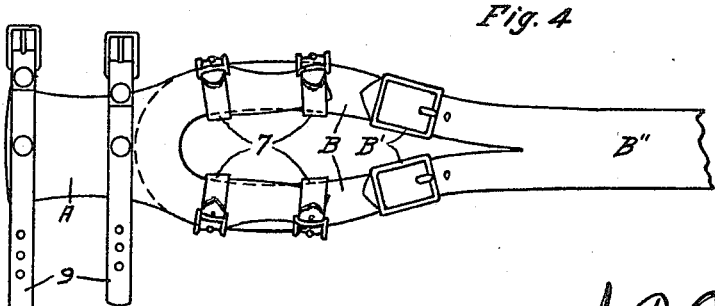
WITNESSES
F. M. Davis.
Charles S. Wilson
J. R. Canion
INVENTOR
BY John M. Snellman
ATTORNEY

UNITED STATES PATENT OFFICE.

JOHN ROSSER CANION, OF AUSTIN, TEXAS.

HORSETAIL-HOLDER.

1,064,707.  Specification of Letters Patent. Patented June 17, 1913.

Application filed September 5, 1912. Serial No. 718,764.

*To all whom it may concern:*

Be it known that I, JOHN ROSSER CANION, a citizen of the United States, and a resident of Austin, county of Travis, and State of Texas, have invented certain new and useful Improvements in Horsetail-Holders, of which the following is a specification, such as will enable others skilled in the art to make and use the same.

My invention relates to improvements in harnesses and more particularly to improved means for holding a horse's tail to prevent it from switching and catching the driving lines or reins during seasons when flies and other insects are troublesome to horses.

It is well known by those who are used to driving that during the fly season, and especially in late summer, a serious source of danger in driving a horse lies in the animal catching one or both of the reins under its tail and thereby preventing proper guidance. This is not only dangerous, but is always annoying and inconvenient.

The object of my invention is to provide tail-holding means arranged for fastening detachably to the crupper of an ordinary harness to prevent switching and to prevent catching of the reins at times when the use of a tail-holder is desirable.

My invention consists in providing a somewhat flexible oblong forked frame or body having means thereon at the forked end for readily attaching to and releasing from the crupper and at the opposite end means for binding to the horse's tail.

A fuller understanding of my invention may be had by reference to the accompanying drawings showing a preferred embodiment of my invention and forming a part of this specification.

Figure 1 is a top plan view of my improved tail holder detached and with the stiffening members shown by dotted lines; Fig. 2 is a cross section on the line 2—2 of Fig. 1 facing with the arrows; Fig. 3 is a cross section on the line 3—3 of Fig. 1 facing with the arrows; and Fig. 4 is a reduced top plan view of my improved tail holding attachment secured to the crupper, ready for use.

Like characters of references refer to like parts in all of the figures.

A is my improved tail holder, and B is the crupper to which it is shown attached in Fig. 4. The crupper may be of ordinary form preferably having buckles B' to permit adjusting to the back strap B'' and to facilitate placing the harness on the animal.

The tail holder A comprises an oblong body bifurcated or forked at the forward end to fit upon the loop end of the crupper B and to receive the tail.

I prefer to make the tail holder of leather to give more or less flexibility, and provide resilient frame members to give the necessary stiffness. I get best results by cutting face and back strips of leather A' and A'' to fit together in pairs for sewing together. Before sewing I take strips of suitable material, preferably spring steel, and bend into shape to fit adjacent to the edges of the holder, one along each side and a third extending around the curved crotch. I then sew the leather, front and back pieces together around the edges. By this means the stiffening members are held securely in place. For the two side stiffeners 5 I prefer to use about No. 12 size wire and for the crotch stiffener 6 I prefer about No. 10 size wire.

For attaching the tail holder to the crupper, I permanently secure a pair of straps 7 with buckles 8 to each arm of the fork. In like manner I secure a pair of straps 9 with buckles 10 to the opposite end of the holder for binding the same to the tail of the horse. Any suitable means may be used for fastening the said straps 7 and 9 to the fastener but I prefer to use metal rivets 12. As will be seen by the drawings, I attach the straps all to the upper side of the holder. When the holder is in use the fork straps 7 loop downward and encircle the adjacent sides of the crupper respectively and the tail straps 9 loop upward and bind the tail C to the rear portion of the holder.

The operation of and method of using my improved holder need little explanation. Ordinarily its use is not required and it may accordingly be removed from the harness, but when insects are troublesome it may be attached to the crupper by the straps 7 and may so remain as long as needed. In order to save the trouble of strapping the tail to the holder in seasons when insects are not troublesome, the holder may be detached from the crupper by unbuckling the straps 7. The harness itself remains at all times unchanged so far as ordinary use is concerned.

Having thus described my invention I claim as new and desire to secure by Letters Patent:

In a harness device of the class described, an oblong body member comprising a pair of similar flat and flexible cover portions forked in a U shape at one end and sewed together around their edges, in combination with a long and slender U shaped resilient member lying between said cover portions adjacent to the inner side of the fork formed by said cover portions, a pair of long and slender resilient members lying between said cover portions adjacent to their longitudinal outer edges, and means constructed and arranged to secure the body member to the tail of a horse.

JOHN ROSSER CANION.

Witnesses:
H. R. FRANKLIN,
W. R. HUTCHESON.

Copies of this patent may be obtained for five cents each, by addressing the "Commissioner of Patents, Washington, D. C."